(12) United States Patent
Konkle

(10) Patent No.: US 6,560,699 B1
(45) Date of Patent: May 6, 2003

(54) CONSTRAINT-BASED LANGUAGE CONFIGURATION FILES FOR UPDATING AND VERIFYING SYSTEM CONSTRAINTS

(75) Inventor: Timothy A. Konkle, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/420,917

(22) Filed: Oct. 20, 1999

(51) Int. Cl.⁷ .................. G06F 15/177; G06F 9/445; G06F 1/24
(52) U.S. Cl. .................. 713/1; 713/2; 713/100
(58) Field of Search .................. 713/1, 2, 100

(56) References Cited

U.S. PATENT DOCUMENTS

| | | | |
|---|---|---|---|
| 5,247,516 A | 9/1993 | Berstein et al. | 370/82 |
| 5,367,635 A | 11/1994 | Bauer et al. | 395/200 |
| 5,524,212 A * | 6/1996 | Somani et al. | 711/121 |
| 5,678,006 A | 10/1997 | Valizadeh et al. | 395/200.02 |
| 5,708,798 A * | 1/1998 | Lynch et al. | 703/1 |
| 5,715,394 A | 2/1998 | Jabs | 395/200.11 |
| 5,768,586 A * | 6/1998 | Zweben et al. | 713/100 |
| 5,799,141 A * | 8/1998 | Galipeau et al. | 714/13 |
| 5,802,042 A | 9/1998 | Natarajan et al. | 370/255 |
| 5,809,287 A | 9/1998 | Stupek, Jr. et al. | 395/500 |
| 5,956,732 A | 9/1999 | Tsuchida | 707/203 |
| 5,968,116 A | 10/1999 | Day, II et al. | 709/202 |
| 5,974,454 A | 10/1999 | Apfel et al. | 709/221 |
| 5,999,740 A | 12/1999 | Rowley | 395/712 |
| 6,074,434 A | 6/2000 | Cole et al. | 717/11 |
| 6,223,345 B1 * | 4/2001 | Jones et al. | 713/100 |
| 6,253,320 B1 * | 6/2001 | Sekiguchi et al. | 713/2 |
| 6,366,876 B1 * | 4/2002 | Looney | 713/1 |
| 6,377,939 B1 * | 4/2002 | Young | 713/1 |
| 6,404,445 B1 * | 6/2002 | Galea et al. | 345/733 |

OTHER PUBLICATIONS

Cisco Systems, Inc., "Cisco DNS/DHCP Manager", printed from http://mwrns.noaa.gov/cisco/cc/td/doc/resprdct/res31.htm, on Sep. 10, 1998, 4 pages..

Cisco Systems, Inc., "CiscoDNS/DHCP Manager V.1.1", printed from http://www.combinet.com/warp/public/751/dnsmg/dnsmg_ds.htm, on Sep. 10, 1998, 4 pages.

Cisco Systems, Inc., "Cisco DNS/DHCP Manager V.1.1", printed from http://www.combinet.com/warp/public/751/dnsmg/dnsmg_pa.htm, on Sep. 10, 1998, 7 pages.

Dhcp Faq, pp. 1–22, printed from http://web.syr.edu/~jmwobus/comfaws/dhcp.faw.html.

Cisco Systems, Inc., "Dhcp Solution Helps Scale and Configure IP Nodes in Growing Switched Networks", printed from http://cio.cisco.co.jp/warp/public/795.6.html, on Sep. 10, 1998, 2 pages.

Droms, R., "Dynamic Host Configuration Protocol," Network Working Group, Rfc 1531, Oct. 1993.

Droms, R., "Interoperation Between Dhcp and Bootp", Oct., 1993, Network Working Group, pp. 1–4, printed from http://www.join.com/rfc 1534.html.

* cited by examiner

Primary Examiner—Thomas Lee
Assistant Examiner—James Trujillo
(74) Attorney, Agent, or Firm—Thelen Reid & Priest LLP; Marc S. Hanish

(57) ABSTRACT

Configuration files may define settings and parameters for hardware and software devices in a computer system. In an embodiment of the present invention, constraint-based language configuration files may be used for the dynamic update of configuration files, as well as for verification of accuracy or compatibility of these configuration files.

74 Claims, 5 Drawing Sheets

CONSTRAINT-BASED LANGUAGE CONFIGURATION FILES FOR UPDATING AND VERIFYING SYSTEM CONSTRAINTS

BACKGROUND OF THE INVENTION

1. Field of the Invention

The present invention relates to the field of constraint-based software languages. More specifically, the present invention relates to the use of constraint-based software languages in configuration files for hardware or software components.

2. The Background

Electronic and mechanical equipment have slowly been incorporating computer-related devices in recent years. Much of the electronic and mechanical equipment currently sold contains at least some portion that can be considered computer related. A prime example of this is in the startup process of various hardware devices. Generally, during power up, a sequence of steps are undertaken to configure the hardware and to ensure that the equipment runs properly. Many hardware devices have hardwired startup sequences, where the startup sequence is built into the electronic or mechanical equipment itself. Some hardware devices contain configuration files, oftentimes stored in non-volatile memory such as Programmable Read-Only Memory (PROM) and Electrically-Erasable Programmable Read-Only Memory (EEPROM), which are accessed upon powering up the device. This allows the devices to execute certain hard-wired startup procedures and to configure settings by varying the parameters of the startup procedures, while also allowing a manufacturer to easily modify the startup parameters during testing, building, and even after shipment of the devices. These configuration files are generally simple binary or textual files indicating the values for certain parameters needed during initialization of the hardware.

One particular field in which such hardware configuration files are especially helpful is networking. In computer networks, devices such as routers, hubs, and gateways may be manufactured in a generic fashion, but particularities within each network require modification of the settings of these devices for each network in order for them to be properly used. Thus, a router, for example, may have a predetermined startup sequence which may alter the settings of the router according to parameters stored in a configuration file in an EEPROM within the router, and thus allow the router to be used in a specific network. If the router was then sold and used in a completely different type of network (or if the configuration of the router needs to be otherwise modified), only the configuration file need be changed.

However, since the configuration files are generally simple text files, there are several drawbacks. The files must generally be updated by the manufacturer, or by a user in a time-consuming update procedure. There is no ability to dynamically update the configuration files automatically, or for that matter, to dynamically update the system in general, for example, when a device is added or removed from the network. There is also no ability to verify the accuracy or compatibility of the configuration files, which could be especially helpful if there is a corrupt portion of the configuration file or other error in the configuration file. Lastly, there is no ability to use the same configuration file across multiple product platforms, as configuration files are very product-specific.

SUMMARY OF THE INVENTION

Configuration files may define settings and parameters for hardware and software devices in a computer system. In an embodiment of the present invention, constraint-based language configuration files may be used for the dynamic update of configuration files, as well as for verification of accuracy or compatibility of these configuration files.

DETAILED DESCRIPTION OF A PREFERRED EMBODIMENT

Figure 1:
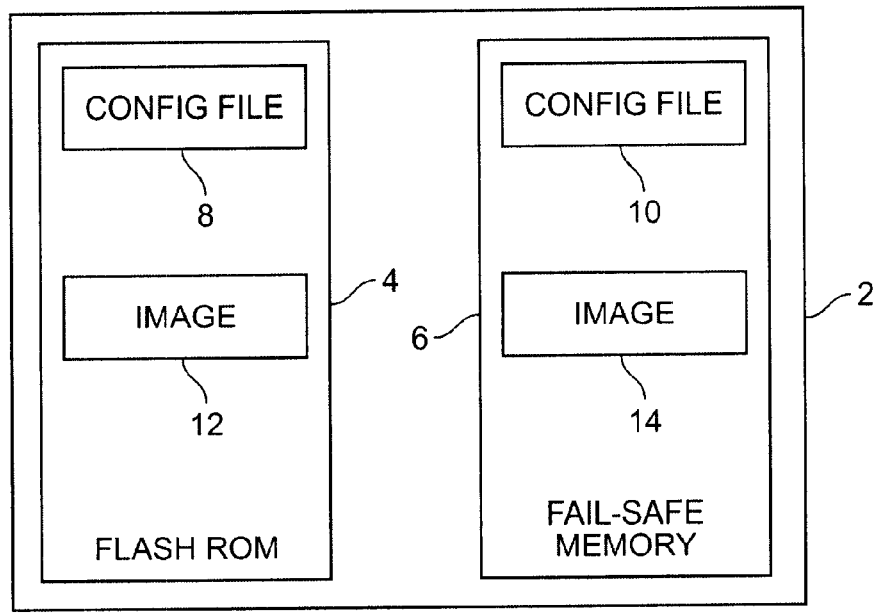
FIG. 1 is a block diagram illustrating a typical router as used in many computer networks.

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using the XML programming language. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Programming languages (such as Fortran, Java, and C++), allow a programmer to specify calculations, actions, and decisions to be carried out. Markup specification languages (such as Hypertext Markup Language—HTML—and Standard Generalized Markup Language—SGML), on the other hand, provides a programmer with the ability to design ways of describing information, normally for storage, transmission, or processing by a program.

Perhaps the most popular markup specification language is HTML, which is currently used extensively on the Internet as the standard for designing web pages. HTML establishes hypertext structure, where a user may follow paths he or she desires, which are linked independently of where the user is. The advantages of HTML are its simplicity and its portability. However, HTML is a fixed markup language, limiting its intelligence, adaptability, and maintenance.

SGML is a language for defining markup languages. Specific markups may be tailored for specific needs. A defining markup is called a Document Type Declaration (DTD). HTML can actually be thought of as one particular DTD. While SGML is extremely powerful, it is weak in the areas that HTML is strong: simplicity and portability.

XML was designed as a hybrid of HTML and SGML. It was actually designed by simplifying the levels of optionality in SGML, redefining some of SGML's internal values and parameters, and it also removes a large number of the more complex and sometimes less-used features which make it harder to write processing programs. XML retains all of SGML's structural abilities which let users define and manage their own document types, so XML does not require a user to use a predefined document type description. This allows groups of people or organizations to create their own customized markup languages for exchanging information in their domain (music, sports, cooking, medicine, etc.).

"Constraint-based programming" is a term used to describe the strategy of programming code that includes a series of rules (or constraint) which must be satisfied (generally in order) before a particular instance of an object may be deemed valid. The constraints are generally defined in a specification, which is simply a data structure set up to define the constraints in such a way that is easily recognizable throughout the system. Constraint-based programming may be accomplished using a variety of different programming languages, such as C, Fortran, Basic, etc. A common data structure which could be used in these programming languages is a binary tree, which lends itself easily for use as a decision tree, which is essentially how a constraint-based programming specification is going to be examined.

XML, however, is especially useful for constraint-based programming due to the organization of its language and the existence of the DTD. Therefore, the present invention will be discussed in terms of XML and DTD, but one of ordinary skill in the art will recognize that the present invention may also be constructed using constraint-based programming in any language and with any data structure acting as the specification.

As stated above, the constraints themselves are stored in a specification, which in XML is the DTD file. This is also sometimes referred to as an abstract data structure, because there are no values stored in the DTD. Below is an example of the code of an XML DTD file:

<!ELEMENT WeatherReport (City, State, Date, Time, CurrTemp)>
   <!ELEMENT City (#PCDATA)>
   <!ELEMENT State (#PCDATA)>
   <!ELEMENT Date (#PCDATA)>
   <!ELEMENT Time (#PCDATA)>
   <!ELEMENT CurrTemp (#PCDATA)>
   <!ATTLIST CurrTemp unit (Fahrenheit|Celsius) #REQUIRED>

This is a fairly simple DTD file, without many levels of depth. The definition describes a Weather report, which contains data including city, state, date, time, and temperature, all in the loose PCDATA format. The only strict constraint is the fact that it is required that an instance include whether the temperature is in Fahrenheit or Celsius. As long as that constraint is met, the instance will be a valid WeatherReport variable.

A file containing the data itself (called an instance, as opposed to the abstract specification) is stored in XML as simply an XML file. Below is an example of one instance of a WeatherReport variable in XML form:

<?xml version="1.0"?>
   <!DOCTYPE WeatherReport SYSTEM "http://www.xweather.com/WeatherReport.dtd">
   <WeatherReport>
      <City>White Plains</City>
      <State>NY</State>
      <Date>Sat Jul 25 1998</Date>
      <Time>11 AM EST</Time>
      <CurrTemp unit="Fahrenheit">70</CurrTemp>
   </WeatherReport>

As can be seen, the data for this instance of the weather report variable includes that it is White Plains, N.Y., Sat Jul. 25, 1998, at 11 AM EST and that the temperature is 70 degrees Fahrenheit. If, for example, the instance has stated "Kelvin" instead of "Fahrenheit", it would be an invalid instance of the variable WeatherReport.

The present invention uses constraint based programming to coordinate hardware configuration files in such a way that allows for the dynamic updating of the configuration files automatically, the verification of the accuracy or compatibility of the configuration files, and the sharing of the same template for configuration files across multiple product platforms.

The present invention has specific application in the field of computer networks, which include networks containing such hardware devices as computers, routers, hubs, bridges, etc. While discussion throughout the application may focus on such computer networks, and the hardware devices being discussed will often be routers, the invention should not be limited to computer networks or routers, as the invention may be applied to any type of hardware device containing a configuration setting, and any type of network.

A router generally has two types of configuration files. The main configuration file is usually stored in non-volatile memory such as Flash ROM or other memory that is easily modifiable. This allows manufacturers and users to upgrade the configuration files easily when necessary. However, occasionally these types of memory get corrupted or are otherwise inaccessible or damaged. In order to allow the router to continue to function in such cases, a fail-safe configuration file is generally maintained. This fail-safe configuration is generally either hardwired into the hardware itself, or provided in a less modifiable memory such as ROM, PROM, or EEPROM. The fail-safe configuration will usually contain configuration settings necessary to allow the hardware to run effectively. This allows the user to be able to initialize the device and perhaps download a corrected configuration file or replace the flash memory. However, in some cases the fail-safe configuration may also be the last configuration which was properly used in the network. For example, if a new configuration file is utilized when a router boots up, and that new configuration file is working properly, the user or manufacturer may wish to save that configuration file as the new fail-safe configuration file. Of course, this is only possible where the fail-safe configuration is stored in modifiable memory such as an EEPROM, and not if it is hardwired into the device.

For purposes of this application, the two types of memory will be referred to as flash memory and fail-safe memory. However, one of ordinary skill in the art will recognize that the term "flash memory" may encompass any memory type and fail-safe memory may also encompass any memory type.

FIG. 1 is a block diagram illustrating a typical router as used in many computer networks. Router 2 contains flash memory 4 and fail-safe memory 6. Stored in flash memory 4 is a configuration file 8. Stored in fail-safe memory 6 is a fail-safe configuration file 10. Flash memory 4 also contains an image 12 of the router software to execute, while fail-safe memory 6 may have a fail-safe image 14 of this software. Router 2 will run using settings contained in the configuration file 8 in flash memory 4 and the software contained in image 12 in flash memory 4 unless a problem is encountered which prevents this, such as if the flash memory 4 gets corrupted or damaged, at which point fail-safe configuration file 10 and/or fail-safe image 14 in fail-safe memory 6 will be used. The fail-safe configuration file 10 and/or fail-safe image will generally only be used until the user or manufacturer has a chance to upgrade or repair the flash memory 4, and can be very valuable if such an upgrade can be performed via the computer network, as the fail-safe configuration file and/or fail-safe image will enable the router 2 to function enough to access the computer network.

Figure 2:
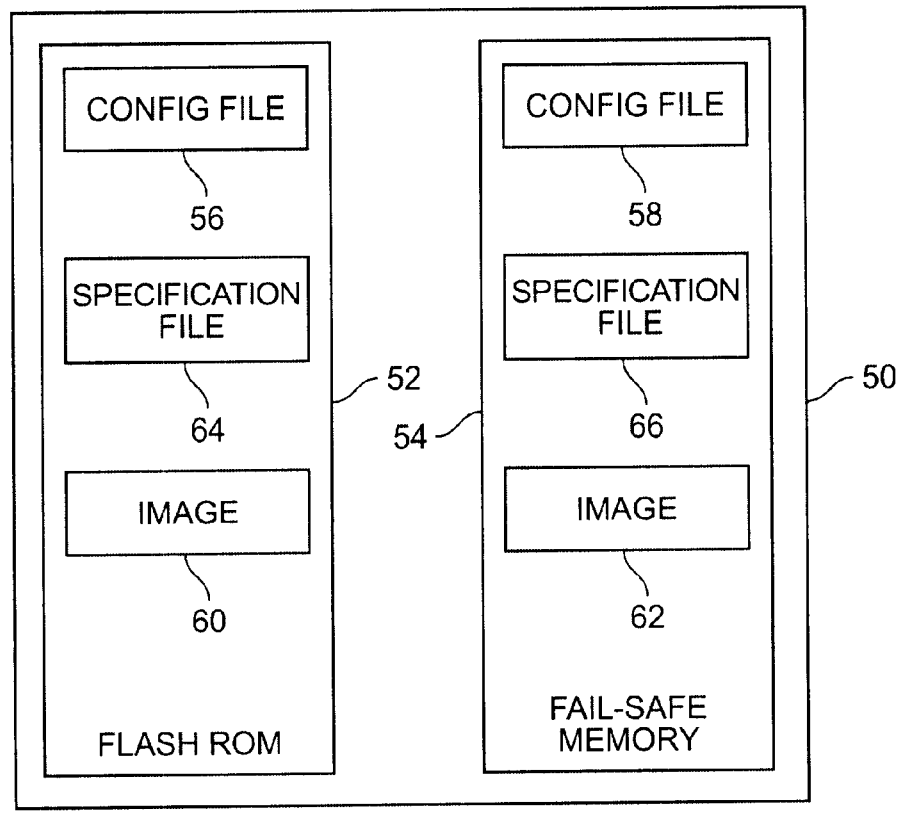
FIG. 2 is a diagram illustrating a router (or other hardware device) according to a presently preferred embodiment of the present invention.

FIG. 2 is a block diagram illustrating a router (or other hardware device) according to a presently preferred embodiment of the present invention. Router 50 again contains flash memory 52 and fail-safe memory 54. Stored in flash memory 52 is a configuration file 56. Stored in fail-safe memory 54 is a fail-safe configuration file 58. Flash memory 52 also contains an image 60 of the router software to execute, while fail-safe memory 54 may have a fail-safe image 62 of this software.

The configuration file 56 contains hardware settings which will be implemented upon powering up the device. These setting may include commands, such as commands for initializing registers, software commands for starting an operating system kernel or application services, or commands for setting global values as runtime parameters.

In addition to the configuration files and images, however, router 50 also contains a specification file 64 in flash memory 52, and a fail-safe specification file 66 in fail-safe memory 54. These specification files are preferably written using constraint-based programming, so that they contain constraints related to the router configuration and/or operation. Additionally, fail-safe configuration file 58 may contain values which further constrain the possible values for variables. For example, a constraint in a specification file may limit the mode of addressing to between 0 and 32-bit addressing, but a value in the fail-safe configuration file may indicate that the constraint should be narrowed to between 16 and 32-bit addressing. Therefore, the specification file 64 may have to be read in light of the fail-safe configuration file 58 to make a proper determination of constraints.

Figure 3:
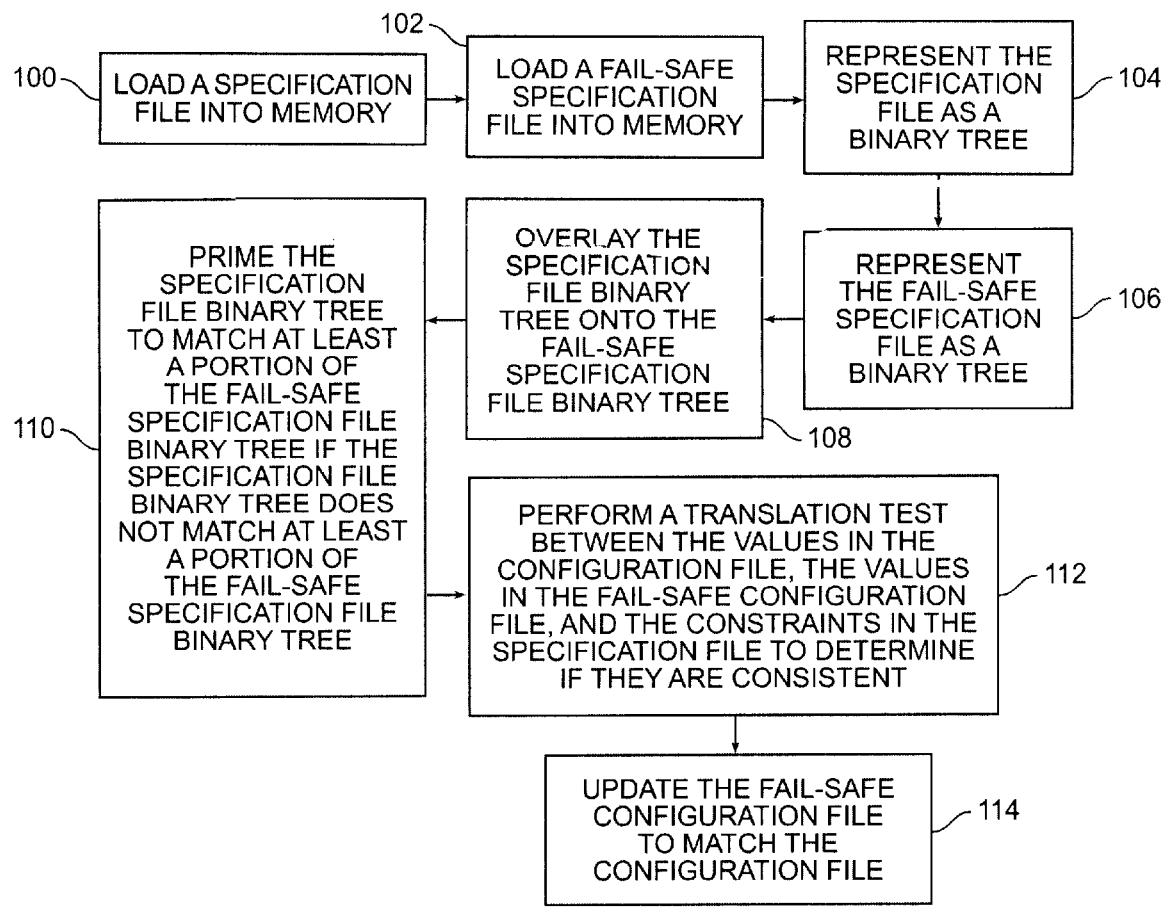
FIG. 3 is a flow diagram illustrating a method for initializing a hardware device according to presently preferred embodiment of the present invention.

FIG. 3 is a flow diagram illustrating a method for initializing a hardware device according to a presently preferred embodiment of the present invention. This method applies when the hardware device has a configuration file and a memory, the configuration file having values. This method may be modified, however, to be used with other hardware devices.

At 100, a specification file is loaded into the memory. In the router example, this specification file may be stored in the flash memory. The specification file has constraints and in the preferred embodiment of the present invention is a DTD file. At 102, a fail-safe specification file is loaded into memory. This fail-safe specification file also has constraints.

Figure 4:
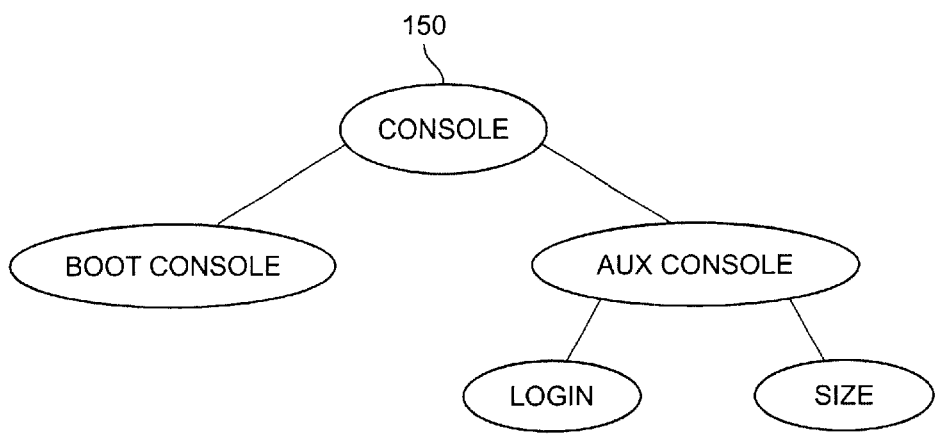
FIG. 4 is a diagram illustrating an example of a binary tree representation of a specification file of a router.

At 104, the specification file may be represented as a binary tree. This binary tree organization will generally be structured by the constraints defined in the specification file, and depends on the type of constraints defined in the specification file. For most hardware networks, the binary tree will be organized by devices and then by settings within those devices. FIG. 4 is a diagram illustrating an example of a binary tree representation of a specification file of a router. Root node 150 may be named "Console" and may contain child nodes defining the rest of the DTD constraint rules and attributes.

Figure 5:
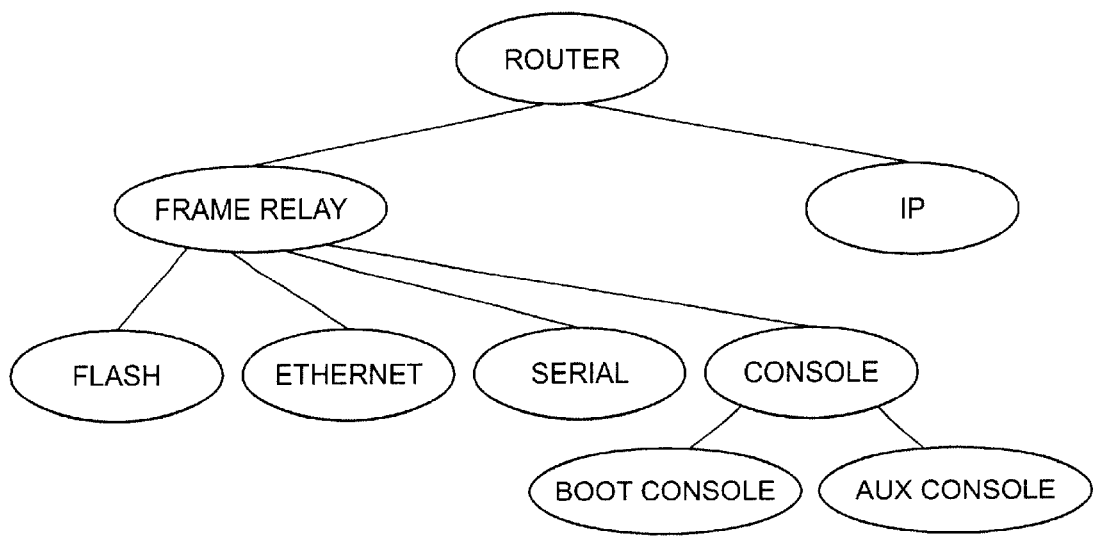
FIG. 5 is a diagram illustrating an example of a binary ree representation of a fail-safe specification file of a router.
Figure 6:
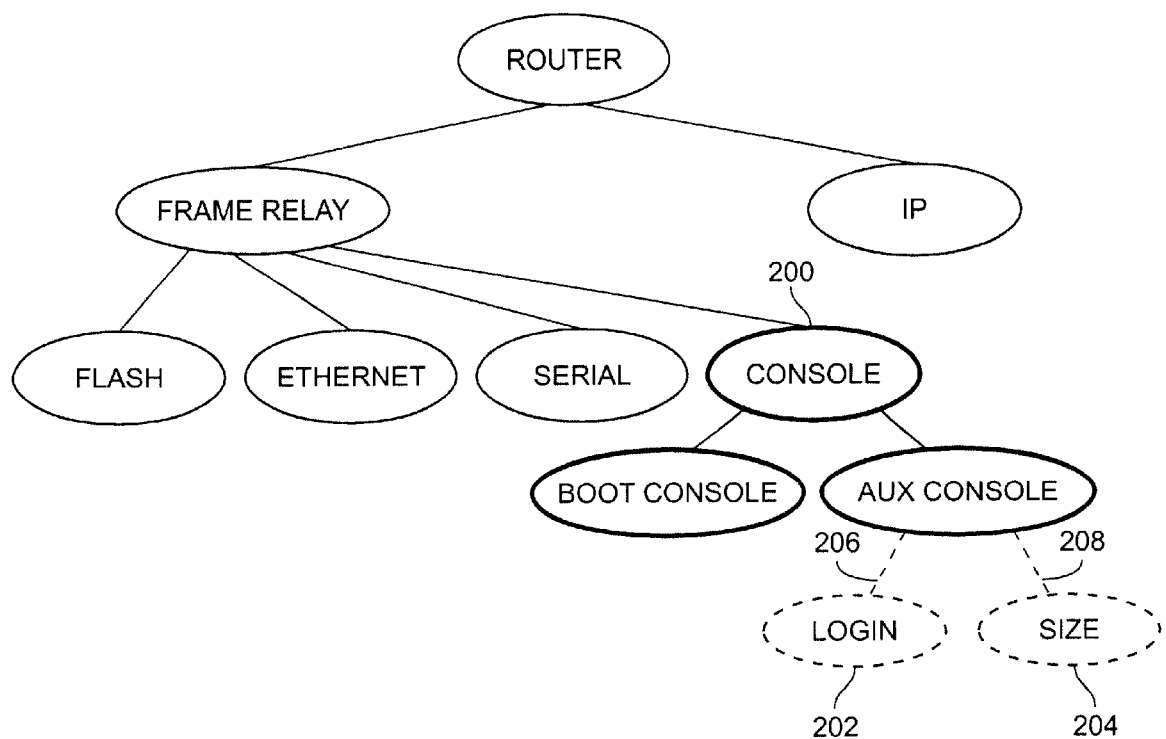
FIG. 6 is a diagram illustrating an example of the result of equivalence testing between the binary trees of FIGS. 4 and 5.

At 106, the fail-safe specification file may be represented as a binary tree in the same way the specification file was. FIG. 5 is a diagram illustrating an example of a binary tree representation of a fail-safe specification file of a router. Then, at 108, the specification file binary tree is overlaid onto the fail-safe specification file binary tree. Overlaying is an exercise which is known to those of ordinary skill in the art, and the specifics are beyond the scope of this disclosure. On the abstract level, overlaying involves placing one binary tree over another so that the differences between the two may be compared. This generally involves locating a common ancestor in both trees, placing those roots over each other, and then letting the rest of the binary trees continue in their normal fashion below the root. This process is generally referred to as equivalence testing. FIG. 6 is a diagram illustrating an example of the result of equivalence testing between the binary trees of FIGS. 4 and 5. Console node 200 was a common ancestor in both FIGS. 4 and 5. FIG. 5 is then overlaid onto FIG. 4 starting with the Console node and then proceeding downwards. Bold borders indicate overlapping nodes while dotted borders indicate paths and node in FIG. 5 that are extraneous when overlaid onto the binary tree of FIG. 4.

At 110, the specification file binary tree is pruned to match at least a portion of the fail-safe specification file binary tree if the specification file binary tree does not match at least a portion of the fail-safe specification file binary tree. This pruning may actually be performed at the same time as the overlaying, as the two are closely related. It basically involves removing any branches that do not match the fail-safe specification file after the two are overlaid. It should be noted that an exact branch for branch match is not necessary. The specification file binary tree may be smaller and less complex than the fail-safe configuration file binary tree. As long as a branch in the specification file binary tree exists in the fail-safe specification file binary tree, there is no need for it to be pruned. Pruning simply involves removing the branch from the binary tree. In the specification file itself, this may involve deleting the references to that branch (and all branches derived from that branch) from the specification file, or it may involve simply marking the references so that they are ignored (the latter solution may be more elegant because it allows for the easy restoration of a branch if it was removed incorrectly or the problem is solved). In FIG. 6, nodes 202 and 204 should be pruned as well as paths 206 and 208.

At this point in the method, the specification file has been "verified". If there were any defects in the file caused by corrupt or damaged memory, the defects have been localized so that the specification file is still in line with the fail-safe specification file. Now the process may turn to verifying the configuration file as well.

At 112, a translation test may be performed between the values in the configuration file, the values in the fail-safe configuration file, and the constraints in the specification file to determine if they are consistent. A translation test is a test used in constraint based programming and involves comparing the values assigned to certain variables with constraints placed on those variables to determine if the values are valid or invalid. If they are valid, the values are consistent with both the specification file (which defines constraints as discussed above) and the fail-safe configuration file (which may further narrow those constraints as discussed above). If they are invalid, the configuration file must be somehow modified in order to be executed, or perhaps an error message will be displayed. In a presently preferred embodiment of the present invention, the configuration file values are modified to conform to the constraints, which includes accepting default values specified in the fail-safe configuration file (e.g. if the constraint limits a value to between 5 and 10, and the current value is 15, but the fail-safe configuration file lists a default value of 8, the value in the configuration file will be changed to 8), reducing or increasing values in the configuration file to match the first values meeting the constraints (e.g. if the constraint limits a value to between 5 and 10 and the current value is 15, it will be reduced to 10), or even removing the variable entirely from the configuration file.

At 114, the fail-safe configuration file may be updated to match the configuration file. This will not be performed each time the configuration file is modified, but there may be certain modifications which may be deemed important enough to now be considered as the fail-safe configuration file values. For example, the default values for a certain variable may be modified in the fail-safe configuration file to match the values in the configuration file because those new values have been found to make the hardware device run more efficiently.

After bootup of the device, the network may function normally. However, in modern networks, any number of problems may originate after the network is up and running. This includes errors occurring in the network as well as simply the removal or addition of new hardware devices, software, or configurations. An advantage of the present invention is that such errors or changes an be automatically corrected for and the configuration files of individual hardware devices (or software for that matter) may be dynamically updated so as to keep the network running, and running efficiently, through such errors and changes.

Figure 7:
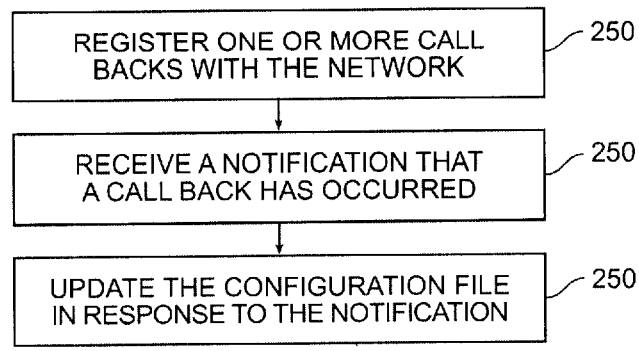
FIG. 7 is a flow diagram illustrating a method for dynamically updating a hardware device in a network according to a presently preferred embodiment of the present invention.

FIG. 7 is a flow diagram illustrating a method for dynamically updating a hardware device in a network according to a presently preferred embodiment of the present invention. At 250, the hardware device registers one or more call backs with the network. Each call back is simply a request for notification upon an event occurring in the network. For example, a router might register for callbacks on changes in the CPU, registers, interrupts, memory, etc. of all devices under its control. When one of these things changes, a notification to the router would enable the router to modify its settings to handle these changes. The overall software or hardware controller handling the call backs and notifications may be different depending upon the type of network. In computer networks, this is generally performed by the Internetwork Operating System (IOS).

At 252, the hardware device may receive a notification that a call back has occurred. Then, at 254, the hardware device may update the configuration file in response to the notification. The form of the update is, of course, dependant on the format of the configuration file and the nature of the event being monitored. Perhaps the most useful event to monitor is the addition or removal of devices on the network, in which case the update may take the form of modification of the binary tree representing the configuration file so as to add or prune branches. However, all sorts of modifications are possible. This allows for a completely "dynamic" network which can automatically configure and reconfigure itself without the need for human interaction. It is also possible that the same technique could be used by software rather than hardware devices, which also may have configuration files that need updating.

Figure 8:
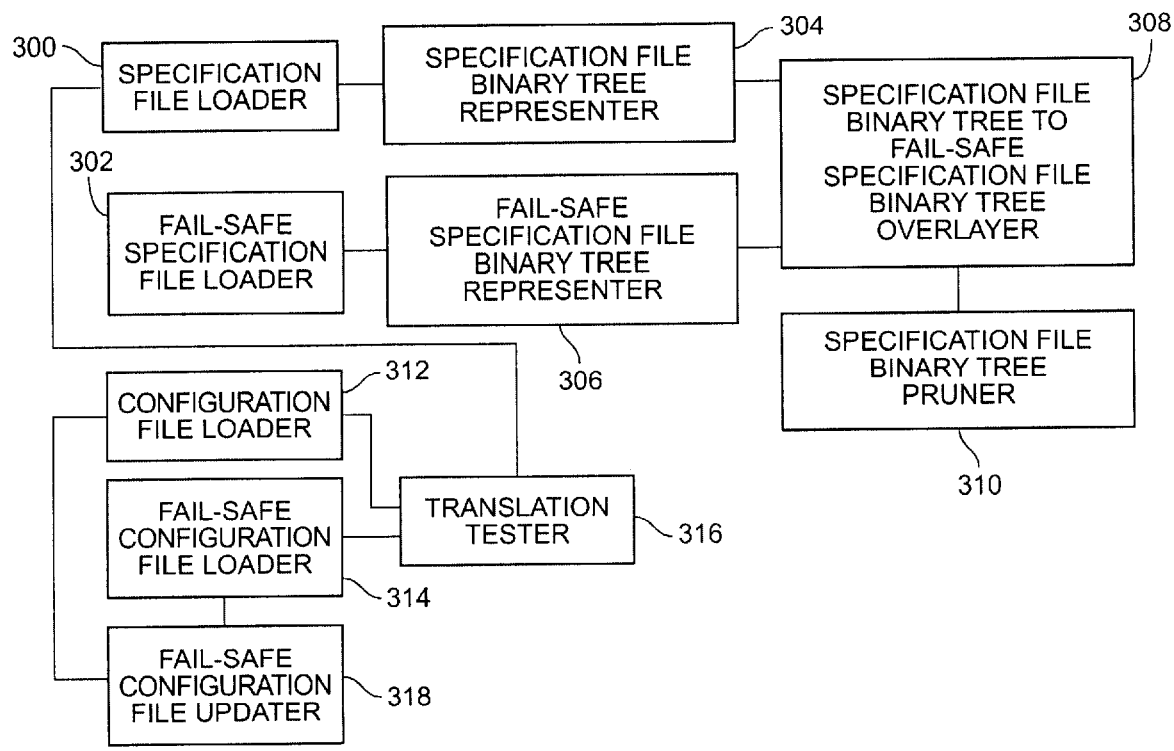
FIG. 8 is a block diagram illustrating a hardware intializer for initializing a hardware device according to a presently preferred embodiment of the present invention.

FIG. 8 is a block diagram illustrating a hardware intializer for initializing a hardware device according to a presently preferred embodiment of the present invention. This embodiment applies when the hardware device has a configuration file and a memory, the configuration file having values. This embodiment may be modified, however, to be used with other hardware devices.

A specification file loader 300 loads a specification file into the memory. In the router example, this specification file may be stored in the flash memory. The specification file has constraints and in the preferred embodiment of the present invention is a DTD file. A fail-safe specification file loader 302 loads a fail-safe specification file into memory. This fail-safe specification file also has constraints.

A specification file binary tree representer 304 coupled to the specification file loader 300 represents the specification file as a binary tree. A fail-safe specification file binary tree representer 306 coupled to the fail-safe specification file loader 302 represents the fail-safe specification file as a binary tree. A specification file binary tree to fail-safe specification file binary tree overlayer 308 coupled to the specification file binary tree representer 304 and the fail-safe specification file binary tree representer 306 then overlays the specification file binary tree onto the fail-safe specification file binary tree.

A specification file binary tree pruner 310 coupled to the specification file binary tree to fail-safe specification file binary tree overlayer prunes the specification file binary tree to match at least a portion of the fail-safe specification file binary tree if the specification file binary tree does not match at least a portion of the fail-safe specification file binary tree.

At this point in the method, the specification file has been "verified". If there were any defects in the file caused by corrupt or damaged memory, the defects have been localized so that the specification file is still in line with the fail-safe specification file. Now the process may turn to verifying the configuration file as well.

A configuration file loader 312 loads the configuration file into memory, while fail-safe configuration file loader 314 loads the fail-safe configuration file into memory. Translation tester 316, coupled to the configuration file loader 312, the fail-safe configuration file loader 314, an d the specification file loader 300 may perform a translation test between the configuration file, the fail-safe configuration file, and the specification file.

A fail-safe configuration file updater 318 may update the fail-safe configuration file to match the configuration file. This will not be performed each time the configuration file is modified, but there may be certain modifications which may be deemed important enough to now be considered as the fail-safe configuration file values.

Figure 9:
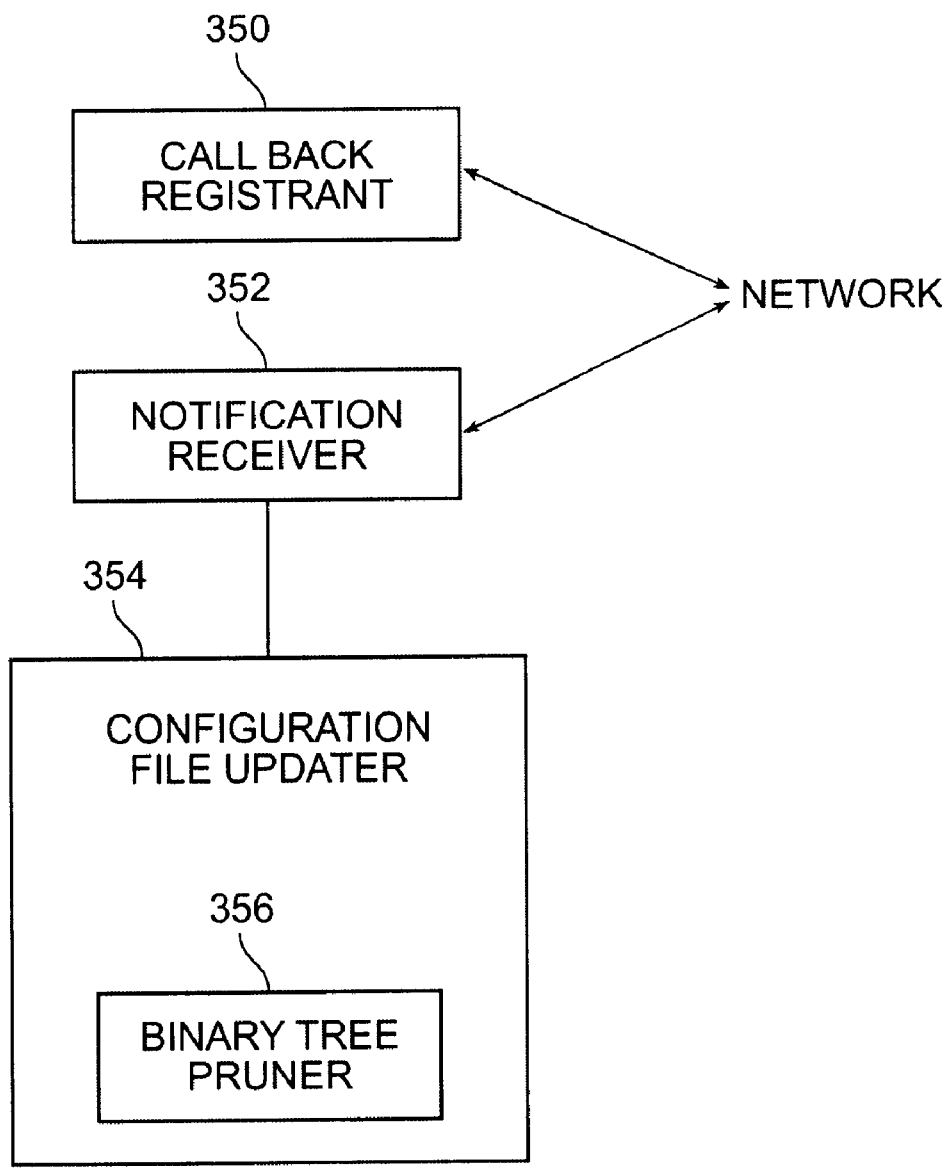
FIG. 9 is a block diagram illustrating a dynamic network updater for dynamically updating hardware device in a network according to a presently preferred embodiment of the present invention.

FIG. 9 is a block diagram illustrating a dynamic network updater for dynamically updating a hardware device in a network according to a presently preferred embodiment of the present invention. A call back registrant 350 registers one or more call backs with the network. Each call back is simply a request for notification upon an event occurring in the network.

Then, a notification receiver 352 may receive a notification that a call back has occurred. Finally, a configuration file updater 354 coupled to the notification receiver 352 may update the configuration file in response to the notification. Perhaps the most useful event to monitor is the addition or removal of devices on the network, in which case the update may take the form of modification of the binary tree representing the configuration file so as to add or prune branches. Therefore, a binary tree pruner 356 may be provided. However, all sorts of modifications are possible. This allows for a completely "dynamic" network which can automatically configure and reconfigure itself without the need for human interaction. It is also possible that the same technique could be used by software rather than hardware devices, which also may have configuration files that need updating.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for initializing a hardware device, the hardware device having a configuration file and a memory, said configuration file including values, the method including:

loading a specification file into the memory, said specification file having constraints;

loading a fail-safe specification file into the memory, said fail-safe specification file having constraints;

adjusting the constraints of said specification file to conform to the constraints in said fail-safe specification file;

loading said configuration file into the memory;

loading a fail-safe configuration file into the memory, said fail-safe configuration file having values; and performing a translation test between the values in the configuration file, said values in said fail-safe configuration file, and said constraints in said specification file to determine if they are consistent.

2. The method of claim 1, wherein said adjusting includes:

representing said specification file as a binary tree;

representing said fail-safe specification file as a binary tree;

overlaying said specification file binary tree onto said fail-safe specification file binary tree; and pruning said specification file binary tree to match at least a portion of said fail-safe specification file binary tree if said specification file binary tree does not match at least a portion of said fail-safe specification file binary tree.

3. The method of claim 1, further including modifying the values in said configuration file to make them consistent with said values in said fail-safe configuration file and said constraints in said specification file if necessary.

4. The method of claim 1, further including updating said fail-safe configuration file to match the configuration file.

5. The method of claim 1, wherein said values in said configuration file includes hardware settings and the method further includes executing commands to configure the hardware device to match said hardware settings.

6. The method of claim 5, wherein said commands include initializing hardware registers.

7. The method of claim 5, wherein said commands include software commands.

8. The method of claim 7, wherein said software commands include starting an operating system kernel.

9. The method of claim 7, wherein said software commands include starting application services.

10. The method of claim 5, wherein said commands include setting global values as runtime parameters.

11. The method of claim 1, wherein said hardware device is a router.

12. The method of claim 11, wherein said configuration file is stored in Flash ROM on said router.

13. The method of claim 11, wherein said specification file is stored in Flash ROM on said router.

14. The method of claim 1, wherein said configuration file, fail-safe configuration file, specification file, and fail-safe specification file are created using constraint-based programming.

15. The method of claim 1, wherein said configuration file and said fail safe-configuration file are XML documents.

16. The method of claim 1, wherein said specification file and said fail-safe configuration file are XML Document Type Declarations.

17. The method of claim 2, further including modifying the values in said configuration file to make them consistent with said values in said fail-safe configuration file and said constraints in said specification file if necessary.

18. The method of claim 2, further including updating said fail-safe configuration file to match the configuration file.

19. The method of claim 2, wherein said values in said configuration file includes hardware settings and the method further includes executing commands to configure the hardware device to match said hardware settings.

20. The method of claim 19, wherein said commands include initializing hardware registers.

21. The method of claim 19, wherein said commands include software commands.

22. The method of claim 21, wherein said software commands include starting an operating system kernel.

23. The method of claim 21, wherein said software commands include starting application services.

24. The method of claim 19, wherein said commands include setting global values as runtime parameters.

25. The method of claim 2, wherein said hardware device is a router.

26. The method of claim 25, wherein said configuration file is stored in Flash ROM on said router.

27. The method of claim 25, wherein said specification file is stored in Flash ROM on said router.

28. The method of claim 2, wherein said configuration file, fail-safe configuration file, specification file, and fail-safe specification file are created using constraint-based programming.

29. The method of claim 2, wherein said configuration file and said fail safe-configuration file are XML documents.

30. The method of claim 2, wherein said specification file and said fail-safe configuration file are XML Document Type Declarations.

31. A method for verifying a specification file on a hardware device, the hardware device having a memory, said specification file including constraints, the method including:

loading the specification file into the memory;

loading a fail-safe specification file into the memory, said fail-safe specification file having constraints;

representing said specification file as a binary tree;

representing said fail-safe specification file as a binary tree;

overlaying said specification file binary tree onto said fail-safe specification file binary tree; and pruning said specification file binary tree to match at least a portion of said fail-safe specification file binary tree if said specification file binary tree does not match at least a portion of said fail-safe specification file binary tree.

32. The method of claim 31, wherein said hardware device is a router.

33. The method of claim 31, wherein said specification file is stored in Flash ROM on said router.

34. The method of claim 31, wherein said specification file and fail-safe specification file are created using constraint-based programming.

35. The method of claim 31, wherein said specification file and said fail-safe configuration file are XML Document Type Declarations.

36. A method for verifying a configuration file on a hardware device, the hardware device having a memory, said configuration file including values, the method including:
   loading said configuration file into the memory;
   loading a fail-safe configuration file into the memory, said fail-safe configuration file having values;
   loading a specification file into the memory, said specification file having constraints; and
   performing a translation test between the values in the configuration file, said values in said fail-safe configuration file, and said constraints in said specification file to determine if they are consistent.

37. The method of claim 36, further including modifying the values in said configuration file to make them consistent with said values in said fail-safe configuration file and said constraints in said specification file if necessary.

38. The method of claim 36, further including updating said fail-safe configuration file to match the configuration file.

39. The method of claim 36, wherein said values in said configuration file includes hardware settings and the method further includes executing commands to configure the hardware device to match said hardware settings.

40. The method of claim 39, wherein said commands include initializing hardware registers.

41. The method of claim 39, wherein said commands include software commands.

42. The method of claim 41, wherein said software commands include starting an operating system kernel.

43. The method of claim 41, wherein said software commands include starting application services.

44. The method of claim 39, wherein said commands include setting global values as runtime parameters.

45. The method of claim 36, wherein said hardware device is a router.

46. The method of claim 45, wherein said configuration file is stored in Flash ROM on said router.

47. The method of claim 36, wherein said configuration file and fail-safe configuration file are created using constraint-based programming.

48. The method of claim 36, wherein said configuration file and said fail safe-configuration file are XML documents.

49. A hardware initializer for initializing a hardware device, the hardware device having a configuration file and a memory, said configuration file including values, the intializer including:
   a specification file loader configured to load a specification file into the memory, said specification file having constraints;
   a fail-safe specification file loader configured to load a fail-safe specification file into the memory, said fail-safe specification file having constraints;
   a specification file binary tree representer configured to represent said specification file as a binary tree and coupled to said specification file loader;
   a fail-safe specification file representer configured to represent said fail-safe configuration file as a binary tree and coupled to said fail-safe specification file loader;
   a specification file binary tree to fail-safe specification file binary tree overlayer configured to overlay said specification file binary tree onto said fail-safe specification file binary tree and coupled to said specification file binary tree representer and said fail-safe specification file representer;
   a specification file binary tree pruner configured to prune said specification file binary tree to match at least a portion of said fail-safe specification file binary tree if said specification file binary tree does not match at least a portion of said fail-safe specification file binary tree and coupled to said specification file binary tree to fail-safe specification file binary tree overlayer;
   a configuration file loader configured to load a configuration file into the memory;
   a fail-safe configuration file loader configured to load a fail-safe configuration file loader into the memory, the fail-safe configuration file having values; and
   a translation tester configured to perform a translation test between the values in the configuration file, said values in said fail-safe configuration file, and said constraints in said specification file to determine if they are consistent and coupled to said configuration file loader, said fail-safe configuration file loader, and said specification file loader.

50. The hardware initializer of claim 49, further including a fail-safe configuration file updater coupled to said configuration file loader and said fail-safe configuration file loader.

51. The hardware initializer of claim 49, further including a fail-safe configuration file modifier coupled to said configuration file loader.

52. The hardware initializer of claim 49, wherein said values in said configuration file includes hardware settings and the hardware initializer further includes a command executor coupled to said configuration file loader.

53. The hardware initializer of claim 49, wherein said hardware device is a router.

54. The hardware initializer of claim 53, wherein said configuration file is stored in Flash ROM on said router.

55. The hardware initializer of claim 53, wherein a specification file is stored in Flash ROM on said router.

56. The hardware initializer of claim 49, wherein said configuration file is created using constraint-based programming.

57. The hardware initializer of claim 49, wherein said configuration file is an XML document.

58. A hardware initializer for verifying a specification file on a hardware device, the hardware device having a memory, said specification file including constraints, the intializer including:
   a specification file loader configured to load the specification file into the memory;
   a fail-safe specification file loader configured to load a fail-safe specification file into the memory, said fail-safe specification file having constraints;
   a specification file binary tree representer configured to represent said specification file as a binary tree and coupled to said specification file loader;

a fail-safe specification file representer configured to represent said fail-safe configuration file as a binary tree and coupled to said fail-safe specification file loader;

a specification file binary tree to fail-safe specification file binary tree overlayer configured to overlay said specification file onto said fail-safe specification file binary tree and coupled to said specification file binary tree representer and said fail-safe specification file representer; and a specification file binary tree pruner configured to prune said specification file binary tree to match at least a portion of said fail-safe specification file binary tree if said specification file binary tree does not match at least a portion of said fail-safe specification file binary tree and coupled to said specification file binary tree to fail-safe specification file binary tree overlayer.

59. The hardware initializer of claim 58, wherein said hardware device is a router.

60. The hardware initializer of claim 59, wherein said specification file is stored in Flash ROM on said router.

61. The hardware initializer of claim 58, wherein said specification file is created using constraint-based programming.

62. The hardware initializer of claim 58, wherein said specification file is an XML document.

63. A hardware initializer for verifying a configuration file on a hardware device, the hardware device having a memory, said configuration file including values, the intializer including:

a configuration file loader configured to load said configuration file into the memory;

a fail-safe configuration file loader configured to load a fail-safe configuration file into the memory, said fail-safe configuration file having values;

a specification file loader configured to load a specification file into the memory; and a translation tester configured to perform a translation test between the values in the configuration file, said values in said fail-safe configuration file, and said constraints in said specification file to determine if they are consistent and coupled to said configuration file loader, said fail-safe configuration file loader, and said specification file loader.

64. The hardware initializer of claim 63, further including a fail-safe configuration file updater coupled to said configuration file loader and said fail-safe configuration file loader.

65. The hardware initializer of claim 63, further including a fail-safe configuration file modifier coupled to said configuration file loader.

66. The hardware initializer of claim 63, wherein said values in said configuration file includes hardware settings and the hardware initializer further includes a command executor coupled to said configuration file loader.

67. The hardware initializer of claim 63, wherein said hardware device is a router.

68. The hardware initializer of claim 63, wherein said configuration file is stored in Flash ROM on said router.

69. The hardware initializer of claim 63, wherein said configuration file is created using constraint-based programming.

70. The hardware initializer of claim 63, wherein said configuration file is an XML document.

71. A program storage device readable by a machine, tangibly embodying a program of instructions executable by the machine to perform a method for initializing a hardware device, the hardware device having a configuration file and a memory, said configuration file including values, the method including:

loading a specification file into the memory, said specification file having constraints;

loading a fail-safe specification file into the memory, said fail-safe specification file having constraints;

adjusting the constraints of said specification file to conform to the constraints in said fail-safe specification file;

loading said configuration file into the memory;

loading a fail-safe configuration file into the memory, said fail-safe configuration file having values; and performing a translation test between the values in the configuration file, said values in said fail-safe configuration file, and said constraints in said specification file to determine if they are consistent.

72. A program storage device readable by a machine, tangibly embodying a program of instructions executable by the machine to perform a method for initializing a hardware device, the hardware device having a configuration file and a memory, said configuration file including values, the method including:

loading a specification file into the memory, said specification file having constraints;

loading a fail-safe specification file into the memory, said fail-safe specification file having constraints;

representing said specification file as a binary tree;

representing said fail-safe specification file as a binary tree;

overlaying said specification file binary tree onto said fail-safe specification file binary tree;

pruning said specification file binary tree to match at least a portion of said fail-safe specification file binary tree if said specification file binary tree does not match at least a portion of said fail-safe specification file binary tree;

loading said configuration file into the memory;

loading a fail-safe configuration file into the memory, said fail-safe configuration file having values; and performing a translation test between the values in the configuration file, said values in said fail-safe configuration file, and said constraints in said specification file to determine if they are consistent.

73. A program storage device readable by a machine, tangibly embodying a program of instructions executable by the machine to perform a method for verifying a specification file on a hardware device, the hardware device having a memory, said specification file including constraints, the method including:

loading the specification file into the memory;

loading a fail-safe specification file into the memory, said fail-safe specification file having constraints;

representing said specification file as a binary tree;

representing said fail-safe specification file as a binary tree;

overlaying said specification file binary tree onto said fail-safe specification file binary tree; and pruning said specification file binary tree to match at least a portion of said fail-safe specification file binary tree if said specification file binary tree does not match at least a portion of said fail-safe specification file binary tree.

74. A program storage device readable by a machine, tangibly embodying a program of instructions executable by the machine to perform a method for verifying a configuration file on a hardware device, the hardware device having a memory, said configuration file including values, the method including:

loading said configuration file into the memory;

loading a fail-safe configuration file into the memory, said fail-safe configuration file having values;

loading a specification file into the memory; and performing a translation test between the values in the configuration file, said values in said fail-safe configuration file, and said constraints in said specification file to determine if they are consistent.

\* \* \* \* \*

UNITED STATES PATENT AND TRADEMARK OFFICE
CERTIFICATE OF CORRECTION

PATENT NO. : 6,560,699 B1
DATED : May 6, 2003
INVENTOR(S) : Timothy A. Konkle

It is certified that error appears in the above-identified patent and that said Letters Patent is hereby corrected as shown below:

<u>Column 8,</u>
Line 51, replace "an d" with -- and --.

Signed and Sealed this

First Day of July, 2003

JAMES E. ROGAN
*Director of the United States Patent and Trademark Office*